(12) United States Patent
Hao et al.

(10) Patent No.: US 11,489,469 B2
(45) Date of Patent: Nov. 1, 2022

(54) METHOD FOR TESTING INITIAL POSITION ANGLE OF ELECTRIC MOTOR ROTOR

(71) Applicant: JING-JIN ELECTRIC TECHNOLOGIES CO., LTD., Beijing (CN)

(72) Inventors: Bin Hao, Beijing (CN); Xiao Ye, Beijing (CN)

(73) Assignee: JING-JIN ELECTRIC TECHNOLOGIES CO., LTD., Beijing (CN)

(*) Notice: Subject to any disclaimer, the term of this patent is extended or adjusted under 35 U.S.C. 154(b) by 643 days.

(21) Appl. No.: 16/479,456

(22) PCT Filed: Dec. 12, 2017

(86) PCT No.: PCT/CN2017/115666
§ 371 (c)(1),
(2) Date: Jul. 19, 2019

(87) PCT Pub. No.: WO2018/133581
PCT Pub. Date: Jul. 26, 2018

(65) Prior Publication Data
US 2019/0393819 A1 Dec. 26, 2019

(30) Foreign Application Priority Data
Jan. 22, 2017 (CN) .......................... 201710054141.5

(51) Int. Cl.
*H02P 21/18* (2016.01)
*H02P 21/22* (2016.01)

(52) U.S. Cl.
CPC .............. *H02P 21/18* (2016.02); *H02P 21/22* (2016.02)

(58) Field of Classification Search
CPC .. H02P 21/18; H02P 21/22; H02P 6/18; H02P 2203/03; H02P 21/32
See application file for complete search history.

(56) References Cited

U.S. PATENT DOCUMENTS

| 2004/0061461 A1* | 4/2004 | Tajima | B60L 15/025 318/700 |
| 2005/0104551 A1 | 5/2005 | Nishimura et al. | |

(Continued)

FOREIGN PATENT DOCUMENTS

| CN | 102882451 A | 1/2013 |
| CN | 103199789 A | 7/2013 |

(Continued)

*Primary Examiner* — Bickey Dhakal
(74) *Attorney, Agent, or Firm* — LKGlobal | Lorenz & Kopf, LLP

(57) ABSTRACT

The present disclosure discloses a method for measuring an initial position angle of a rotor of an electric machine, which solves the technical problem in the prior art that the requirement on the measurement conditions of the initial position angle of the rotor of the electric machine is high and the actual operation is not easy. The method comprises: Step 1, supplying an electric current i to an electric machine to be measured to cause the electric machine to run; Step 2, when the electric machine is running, reducing the electric current i to be zero; Step 3, measuring voltages of a d-axis and a q-axis of a stator of the electric machine at the moment, respectively as $u_d$ and $u_q$; and Step 4, according to a trigonometric function relation between $u_d$ and $u_q$, calculating to obtain an initial position angle deviation $\theta_{err}$ of the rotor of the electric machine.

9 Claims, 1 Drawing Sheet

(56) References Cited

U.S. PATENT DOCUMENTS

| | | |
|---|---|---|
| 2008/0272731 A1 | 11/2008 | Schulz et al. |
| 2014/0346983 A1* | 11/2014 | Kato ................... H02P 21/0089 |
| | | 318/400.02 |
| 2018/0191285 A1* | 7/2018 | Shigeta ................... H02P 27/06 |

FOREIGN PATENT DOCUMENTS

| | | |
|---|---|---|
| CN | 103731083 A | 4/2014 |
| CN | 103840725 A | 6/2014 |
| CN | 104579084 A | 4/2015 |
| CN | 106100486 A | 11/2016 |
| CN | 106130430 A | 11/2016 |
| CN | 106787995 A | 5/2017 |
| DE | 102012005970 A1 | 10/2012 |
| EP | 2200171 A1 | 6/2010 |
| EP | 2770627 A1 | 8/2014 |
| JP | H01167614 A | 7/1989 |
| JP | 2002272175 A | 9/2002 |
| JP | 2009225596 A | 10/2009 |
| JP | 2014180081 A | 9/2014 |
| WO | 2007007387 A1 | 1/2007 |

\* cited by examiner

METHOD FOR TESTING INITIAL POSITION ANGLE OF ELECTRIC MOTOR ROTOR

CROSS-REFERENCE TO RELATED APPLICATION

This Application is a U.S. National-Stage entry under 35 U.S.C. § 371 based on International Application No. PCT/CN2017/115666, filed Dec. 12, 2017 which was published under PCT Article 21(2) and which claims priority to Chinese Application No. 201710054141.5, filed Jan. 22, 2017, which are all hereby incorporated herein in their entirety by reference.

TECHNICAL FIELD

This Application pertains to a method for measuring an initial position angle of a rotor of an electric machine, for detecting the initial position angle of a rotor of an electric machine.

BACKGROUND

Along with the development and promotion of the technology of new energy automobiles, the requirement on the servo performance of electric machine driving is increasingly higher. Control on an electric machine employs a vector control method, and the initial position angle of the rotor of an electric machine is an important parameter in vector control, and is required to be obtained in advance by measurement.

The initial position angle of the rotor of the electric machine is an important parameter in control on an electric machine, and its accuracy is of vital importance for sufficiently utilizing the performance of the electric machine. Many practical problems that happen on field are relative to the errors in the initial position angle of the rotor of the electric machine. The measurement of the initial position angle of the rotor of the electric machine and the accuracy of the measurement are very critical.

During the vector control on a permanent magnet synchronous motor, a controller controls the direction of the vector of the resultant magnetic field of the three-phase currents of the stator. In order to effectively control the stator vector, it is required to perform accurate measurement on the position of the rotor. A position sensor is installed on the rotor of the electric machine, such as a photoelectric coded disk and a rotating transformer, and a decoding chip is installed on a control board. The fundamental purpose for the initial positioning of the position sensor is to obtain the corresponding absolute angle of the encoder when the position angle of the rotor of the electric machine is 0°, according to which information the position angles of the rotor of the electric machine and the absolute angles of the encoder can be corresponded one to one. Here that is explained by taking an example wherein a rotating transformer serves as the position sensor.

1. Direct Measuring Method

The initial position of the rotor of the electric machine can usually be obtained by measuring the correspondence relation between the zero crossing point of the back electromotive force of the electric machine and the angle of the rotor position sensor. During the measurement of the back electromotive force of the electric machine, the electric machine windings are required to open, to drag the rotor of the electric machine to be measured to rotate at a constant rotational speed, and at the same time the back electromotive force and the signal of the position angle of the rotor are measured, to find the angle correspondence relation. Such a method usually requires to use devices such as an oscilloscope or a voltage sensor, and due to the restriction by the conditions of the project field, the feasibility of practical field operation is relatively low.

2. Indirect Measuring Method

The principle of the indirect measuring method is to stop the rotor of the electric machine at a position that coincides with the A phase axis of the stator, that is, the zero angle position, and at this moment read the current position information from the rotary decoding chip, which is the initial position of the rotor of the electric machine. To rotate the electric machine to the position that coincides with the A phase axis of the stator, it is required to supply to the electric machine a voltage vector that coincides with the A phase axis, and at this moment the electric current of the electric machine flows from the A phase into the electric machine and flows from the B phase and the C phase out of the electric machine. The method has a high requirement on the measurement conditions, the magnitude of the load of the electric machine greatly affects the measurement precision, and the practical field operation is different.

Generally, the electric-machine control system feeds back a parameter of the current position angle of the rotor of the electric machine, but the parameter may be an erroneous numerical value, or may be a correct numerical value, and whether it is erroneous or correct cannot be determined. To accurately measure the initial position angle of the rotor of the electric machine, the deviation of the initial position angle of the rotor of the electric machine may be measured on the basis of the feedback parameter, to obtain the accurate initial position angle of the rotor of the electric machine. Therefore, how to accurately measure the deviation value of the initial position angle of the rotor of the electric machine is critical. In addition, other objects, desirable features and characteristics will become apparent from the subsequent summary and detailed description, and the appended claims, taken in conjunction with the accompanying drawings and this background.

SUMMARY

Aiming at the above problems of the prior art, the present disclosure provides a method for measuring an initial position angle of a rotor of an electric machine, by directly calculating to obtain the initial position angle deviation of the rotor of the electric machine by using the trigonometric function relation of the voltages of a d-axis and a q-axis of the stator of the electric machine, which provides an accurate reference for correctly measuring the initial position angle of the rotor of the electric machine. The method has the advantage that the condition measurement at the project field is easy to realize and the field personal can easily handle.

To achieve the above objects, the technical solutions of the present disclosure are realized as follows:

A method for measuring an initial position angle of a rotor of an electric machine, wherein the method comprises the following steps:

Step 1, firstly supplying an electric current i to an electric machine to be measured to cause the electric machine to run;

Step 2, when the electric machine is running, reducing the electric current i to be zero;

Step 3, measuring voltages of a d-axis and a q-axis of a stator of the electric machine at the moment, respectively as ud and uq; and Step 4, according to a trigonometric function relation between ud and uq, calculating to obtain an initial position angle deviation θerr of the rotor of the electric machine.

Optionally, when the electric machine is rotating in a positive direction, $\theta_{err}$=arctan 2($u_d$, $u_q$). The arctan2 is the expression of the "arc tangent" in the four-quadrant trigonometric functions, which applies to the full text.

Optionally, when the electric machine is rotating in a reverse direction, $\theta_{err}$=arctan 2($-u_d$, $-u_q$).

Optionally, the electric current i is controlled to be obtained by using a current converter.

Optionally, θerr is an electric angle value or a digital pulse number converted by a rotary decoding chip.

Optionally, the initial position angle θ of the rotor of the electric machine is the digital pulse number, wherein θ=α+ (β×γ);

α is a current initial position angle feedback pulse number of the rotor of the electric machine; wherein α is a parameter of the current position angle of the rotor of the electric machine that is fed back in the electric-machine control system, which may be an erroneous numerical value, or may be a correct numerical value, and whether it is erroneous or correct cannot be determined;

β is a direction of the initial position angle deviation of the rotor of the electric machine, wherein when the electric machine is rotating in a positive direction, β=1, and when the electric machine is rotating in a reverse direction, β=−1; and γ is a pulse filtering value of the initial position angle deviation θerr of the rotor of the electric machine.

Optionally, the voltage of the d-axis $u_d=R_s i_d-\omega_e L_q i_q$, and the voltage of the q-axis $u_q=R_s i_q+\omega_e L_d i_d+\omega_e \psi_{rd}$;

wherein Rs is a phase resistance of the electric machine to be measured, Ld and Lq are inductances of the d-axis and the q-axis of the electric machine respectively, ωe is an angular velocity of the rotor, and $\psi rd$ is a flux of the rotor.

When the controller controls the electric current i to be zero, that is, id=0 and iq=0, it can be obtained that:

$$u_d=0$$

$$u_q=\omega_e \psi_{rd}=E$$

That is, the voltage of the d-axis is zero, and the voltage of the q-axis is the back electromotive force of the electric machine. However, when an initial position angle deviation exists, in the coordinate system of the rotor of the electric machine, both of the d-axis and the q-axis have an angle deviation with respect to the positions of the magnetic poles of the rotor, as shown in FIG. 1. At the moment, the voltages of the d-axis and of the q-axis are no longer zero, and the angle deviation θerr and the voltages of the d-axis and the q-axis are of a trigonometric function relation of arc tangent, that is:

when the electric machine is rotating in a positive direction: $\theta_{err}$=arctan 2($u_d$, $u_q$)

when the electric machine is rotating in a reverse direction: $\theta_{err}$=arctan 2($-u_d$, $-u_q$)

Optionally, a frequency of the electric current i is less than a rated frequency of the electric machine.

Optionally, the frequency of the electric current i is ⅓ of the rated frequency of the electric machine.

Optionally, the electric machine is a permanent magnet synchronous motor or is an electrically excited synchronous motor.

The present disclosure has the following advantages:

The present disclosure proposes a new algorithm for measuring the initial position angle of a rotor. Compared with the algorithms in the prior art (for example, which require to reach a particular rotational speed or require the measurement duration to reach 4 seconds), the present disclosure has a very low requirement on the measurement duration (less than 1 second), does not require a particular rotational speed, and does not have the problem regarding the convergence of the measurement results, so it is very easy for field operation, thereby improving the performance, the reliability and the usability of the product.

The method has a low requirement on the measurement conditions, can be easily known and implemented by the field personal, and has quick and accurate convergence. Moreover, the method can perform measuring at the time intervals between the normal operations of the electric machine and the controller, and if the initial position angle of the rotor of the electric machine is erroneous, it will immediately give the correct value of the initial position angle, thereby improving the capacity of system failure diagnosis and error correction and the function safety properties.

The method does not require to add any cost in the hardware, and the modification to the control software of the current converter is simple and easy to perform. The condition measurement at the project field is easy to implement, and the field personal can easily handle. The measuring process has a high speed, a short duration and a high accuracy. The method can perform measuring at the time intervals between the normal operations of the system, which improves the system failure diagnosis and function safety.

The method clarifies the correspondence relation between the voltage of the electric machine end in the controller of the electric machine and the initial position angle of the rotor, and can realize on-line fault diagnosis and error correction control, to improve the system function safety.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the Application and uses of the invention. Furthermore, there is no intention to be bound by any theory presented in the preceding background of the invention or the following detailed description.

In order to make the objects, the technical solutions and the advantages of the present disclosure clearer, the embodiments of the present disclosure will be described below in further detail in conjunction with the drawings.

The First Embodiment

Figure 1:
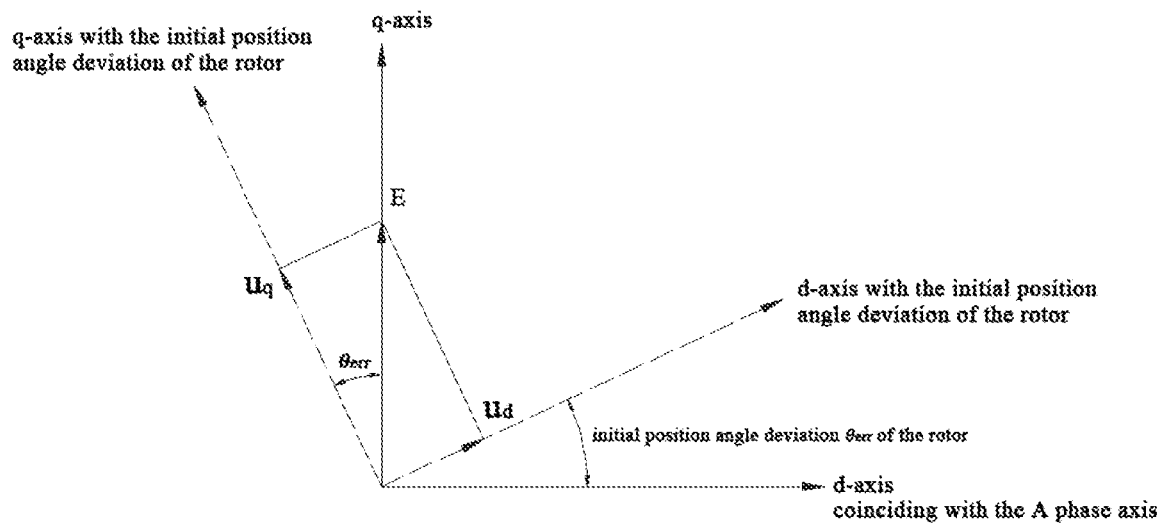
FIG. 1 is a schematic diagram of the trigonometric function relation between the voltages of the d-axis and the q-axis of the stator of the electric machine.

As shown in FIG. 1, in the first embodiment of the present disclosure, a method for measuring an initial position angle of a rotor of an electric machine is disclosed, wherein the method comprises the following steps:

Step 1, firstly supplying an electric current i to an electric machine to be measured to cause the electric machine to run; wherein the frequency of the electric current i is relatively low, and the measurement can be preformed as long as the electric machine begins to rotate; the electric current frequency decides the rotational speed of the electric machine, so the frequency of the electric current i can be within the range of the rated rotational speed; for example, the frequency of the electric current i is ⅓ of the rated frequency of the electric machine;

Step 2, when the electric machine is running, reducing the electric current i to be zero;

Step 3, measuring voltages of a d-axis and a q-axis of a stator of the electric machine at the moment, respectively as ud and uq; and Step 4, according to a trigonometric function relation between the ud and the uq, calculating to obtain an initial position angle deviation θerr of the rotor of the electric machine at the moment.

The electric machine that is measured in this embodiment is a synchronous motor, which may be a permanent magnet synchronous motor, or be an electrically excited synchronous motor.

The d-axis and the q-axis in a permanent magnet machine are defined as follows: in the synchronous coordinate system of the rotor, the d-axis is at the N pole of the rotor, and the q-axis is orthogonal to the d-axis, and leads the d-axis by 90 degrees. Therefore, once the coordinate system has been established, all of the physical variables of the stator and the rotor of the electric machine can be converted and expressed in the coordinate system. The essence of that is that for the entire electric machine a d-axis and a q-axis are defined, and the coordinate axis is on the rotor and rotates along with the rotor. For example, the three-phase voltages ua, ub and uc of the stator windings, when converted to the synchronous coordinate system of the rotor, are ud and uq, which are respectively referred to as the stator d-axis voltage or the stator q-axis voltage, and are physical variables on the stator.

When the electric machine is rotating in a positive direction, $\theta_{err}=\arctan 2(u_d, u_q)$. The arctan2 is the expression of the "arc tangent" in the four-quadrant trigonometric functions, which applies to the full text.

When the electric machine is rotating in a reverse direction, $\theta_{err}=\arctan 2(-u_d, -u_q)$.

The electric current i is controlled to be obtained by using a current converter. The current converter is in-built in the electric machine to be measured, or a separate current converter that is installed on the electric machine.

θerr is an electric angle value or a digital pulse number converted by a rotary decoding chip.

θerr is an electric angle value θe, and it may also be expressed as the digital pulse number D converted by a rotary decoding chip.

The conversion relation between the electric angle value θe and the digital pulse value D is:

θe=(D/4096)×(PM/PR)×360, wherein PM is the number of the pole pairs of the electric machine, and PR is the number of the pole pairs of a rotating transformer.

The conversion precision of the decoding chip decides the range of the digital pulse value. For example, the digital pulse range corresponding to the 12-bit precision is 2^12=4096.

Figure 2:
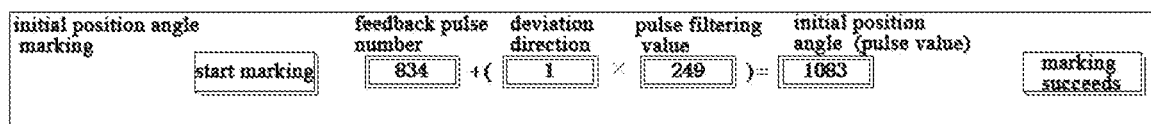
FIG. 2 is an interface diagram of marking the initial position angle of the rotor of the electric machine by using a computer program.

As shown in FIG. 2, when the initial position angle θ of the rotor of the electric machine is the digital pulse number, wherein θ=α+(β×γ);

α is a current initial position angle feedback pulse number of the rotor of the electric machine;

β is a direction of the initial position angle deviation of the rotor of the electric machine, wherein when the electric machine is rotating in a positive direction, β=1, and when the electric machine is rotating in a reverse direction, β=−1; and γ is a pulse filtering value of the initial position angle deviation θerr of the rotor of the electric machine. The parameter is the numerical value that is obtained by filtering off the high-frequency interference and the glitches in the signal, which enhances the accuracy and the anti-interference performance of the measurement.

FIG. 2 shows that, in order to adjust and compensate an erroneous initial angle of the rotor into a correct initial angle of the rotor, the pulse value of the initial position angle of the measurement object is measured firstly by using a conventional method to be 1083. Then it is changed to an erroneous initial angle, and by using the measuring method of this embodiment, the initial position angle of the rotor is measured to substantially maintain at the pulse value of 1083.

FIG. 2 shows an upper computer interface diagram, which can be displayed on a computer screen, and can be implemented by an upper computer software (for example, LabVIEW) through CAN communication.

The principle of calculating the initial position angle deviation θerr of the rotor of the electric machine is as follows:

By neglecting the mutual inductance between the d-axis and the q-axis, and considering merely the fundamental component, the equation of the voltage of the electric machine is:

$$u_d = R_s i_d - \omega_e L_q i_q \tag{1}$$

$$u_q = R_s i_q + \omega_e L_d i_d + \omega_e \psi_{rd} \tag{2}$$

wherein Rs is a phase resistance of the electric machine, Ld and Lq are inductances of the d-axis and the q-axis of the electric machine respectively, ωe is an electric angular velocity, and $\psi_{rd}$ is a flux of the rotor.

When the controller controls the electric current to be zero, that is, id=0 and iq=0, it can be obtained that:

$$u_d = 0 \tag{3}$$

$$u_q = \omega_e \psi_{rd} = E \tag{4}$$

That is, the voltage of the d-axis is zero, and the voltage of the q-axis is the back electromotive force of the electric machine. However, when the rotor has an initial position angle deviation, in the coordinate system of the rotor of the electric machine, both of the d-axis and the q-axis of the stator have an angle deviation with respect to the positions of the magnetic poles of the rotor, as shown in FIG. 1. At the moment, the voltages of the d-axis and of the q-axis are no longer zero, and the angle deviation θerr and the voltages of the d-axis and the q-axis are of a trigonometric function relation of arc tangent, that is:

when the electric machine is rotating in a positive direction:

$$\theta_{err} = \arctan 2(u_d, u_q) \tag{5}$$

when the electric machine is rotating in a reverse direction:

$$\theta_{err} = \arctan 2(-u_d, -u_q) \tag{6}$$

Therefore, according to the equation (5) or (6), the initial position angle deviation of the rotor can be obtained by calculating in real time.

The measuring method of this embodiment is implemented by using a computer program in actual use, in which the measuring method is written into codes and the control software of the current converter is modified to add functions, which is simple to operate.

The Second Embodiment

In the second embodiment of the present disclosure, the trigonometric function relation of the initial position angle deviation θerr of the rotor of the electric machine is expressed as follows:

when the electric machine is rotating in a positive direction, θerr=arccot2(uq, ud).

when the electric machine is rotating in a reverse direction, θerr=arccot2(−uq, −ud).

Certainly, it may also be expressed by using other trigonometric functions, such as arcsine and anticosine, which are not individually listed here.

The description above is merely particular embodiments of the present disclosure. By the foregoing teachings of the present disclosure, a person skilled in the art may make other improvements or modifications based on the foregoing embodiments. A person skilled in the art should understand that, the particular description above is merely for better interpreting the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for measuring an initial position angle of a rotor of an electric machine, wherein a control system of the electric machine feeds back a parameter of a current position angle, and the method comprises the following steps:

Step 1, firstly supplying an electric current (i) to the electric machine to cause the electric machine to run;

Step 2, when the electric machine is running, reducing the electric current (i) to be zero;

Step 3, measuring voltages of a d-axis and a q-axis of a stator of the electric machine at the moment, respectively as $u_d$ and $u_q$; and Step 4, calculating to obtain an initial position angle deviation $\theta_{err}$ of the rotor of the electric machine according to a trigonometric function relation between $u_d$ and $u_q$, and further obtaining the initial position angle according to $\theta=\alpha+(\beta\times\gamma)$;

where $\theta$ is a digital pulse number of the initial position angle of the rotor of the electric machine;

$\alpha$ is a current initial position angle feedback pulse number of the rotor of the electric machine;

$\beta$ is a direction of the initial position angle deviation of the rotor of the electric machine, when the electric machine is rotating in a positive direction, $\beta=1$, and when the electric machine is rotating in a reverse direction, $\beta=-1$; and $\gamma$ is a pulse filtering value of the initial position angle deviation $\theta_{err}$ of the rotor of the electric machine.

2. The method according to claim 1, wherein when the electric machine is rotating in a positive direction, $\theta_{err}=\arctan 2(u_d, u_q)$, where $u_d$ and $u_q$ are voltages of the d-axis and the q-axis of the stator of the electric machine respectively when the electric current (i) is zero.

3. The method according to claim 1, wherein when the electric machine is rotating in a reverse direction, $\theta_{err}=\arctan 2(-u_d, u_q)$, where $u_d$ and $u_q$ are voltages of the d-axis and the q-axis of the stator of the electric machine respectively when the electric current (i) is zero.

4. The method according to claim 1, wherein the supplying the electric current (i) to the electric machine and reducing the electric current (i) to be zero is realized by using a current converter.

5. The method according to claim 1, wherein the $\theta_{err}$ is converted to a digital pulse number by a rotary decoding chip.

6. The method according to claim 1, wherein the voltage of the d-axis $u_d=R_s i_d-\omega_e L_q i_q$, and the voltage of the q-axis $u_q=R_s i_q+\omega_e L_d i_d+\omega_e \psi_{rd}$;

where $R_s$ is a phase resistance of the electric machine to be measured, $L_d$ and $L_q$ are inductances of the d-axis and the q-axis of the electric machine respectively, $\omega_e$ is an angular velocity of the rotor, and $\psi_{rd}$ is a flux of the rotor.

7. The method according to claim 1, wherein a frequency of the electric current (i) causing the electric machine to run is less than a rated frequency of the electric machine.

8. The method according to claim 7, wherein the frequency of the electric current (i) causing the electric machine to run is 1/3 of the rated frequency of the electric machine.

9. The method according to claim 1, wherein the electric machine is a permanent magnet synchronous motor or is an electrically excited synchronous motor.

* * * * *